(12) United States Patent
Covi et al.

(10) Patent No.: US 6,515,840 B2
(45) Date of Patent: Feb. 4, 2003

(54) SOLID STATE CIRCUIT BREAKER WITH CURRENT OVERSHOOT PROTECTION

(75) Inventors: Kevin Covi, Glenford, NY (US); Robert B. Schlak, Hyde Park, NY (US); Raymond J. Harrington, Staatsburg, NY (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/794,938

(22) Filed: Feb. 27, 2001

(65) Prior Publication Data

US 2002/0118500 A1 Aug. 29, 2002

(51) Int. Cl.[7] .................................................. H02H 3/08
(52) U.S. Cl. ................. 361/93.1; 361/56.03; 361/56.04
(58) Field of Search .......................... 363/56.03, 56.04; 361/93; 324/522

(56) References Cited

U.S. PATENT DOCUMENTS

| | | | |
|---|---|---|---|
| 3,912,980 A | | 10/1975 | Crump et al. |
| 4,054,816 A | * | 10/1977 | Keidl .......................... 315/387 |
| 4,068,283 A | * | 1/1978 | Russell ....................... 361/205 |
| 4,245,184 A | | 1/1981 | Billings et al. |
| 4,245,185 A | | 1/1981 | Mitchell et al. |
| 4,266,259 A | * | 5/1981 | Howell ......................... 361/97 |
| 4,706,177 A | * | 11/1987 | Josephson ..................... 363/24 |
| 4,851,743 A | * | 7/1989 | Schmerda et al. ........... 388/811 |
| 4,918,566 A | | 4/1990 | Brodsky et al. |
| 5,185,686 A | * | 2/1993 | Hansen et al. ................ 361/45 |
| 5,444,358 A | | 8/1995 | Delepaut |
| 5,581,433 A | | 12/1996 | Jordan |
| 5,682,101 A | * | 10/1997 | Brooks et al. ............... 324/536 |
| 5,726,848 A | | 3/1998 | Boenig |
| 5,818,669 A | | 10/1998 | Mader |
| 5,917,690 A | | 6/1999 | Anderson |
| 5,943,203 A | | 8/1999 | Wang |
| 6,002,563 A | | 12/1999 | Esakoff et al. |
| 6,016,245 A | | 1/2000 | Ross |

FOREIGN PATENT DOCUMENTS

| | | |
|---|---|---|
| JP | 10020948 | 1/1998 |
| JP | 11136944 | 5/1999 |

OTHER PUBLICATIONS

A. Sedra et al., Microelectronic Circuit, 1987, Holt, Reinehart & Winston, pp. 236–238.*

* cited by examiner

Primary Examiner—Stephen W. Jackson
Assistant Examiner—Z Kitov
(74) Attorney, Agent, or Firm—Floyd A. Gonzalez; Cantor Colburn LLP

(57) ABSTRACT

A solid state circuit breaker is disclosed for use in connection with a voltage bus, the voltage bus supplying electrical current to a load. The solid state circuit breaker includes a current controller for controlling the magnitude of current supplied by the voltage bus. A first current sensor senses the magnitude of the electrical current supplied by the voltage bus, the first current sensor having an output in communication with the current controller. An inductor is included within the first current sensor, the inductor providing a back electromotive force on the voltage bus. The back electromotive force is proportional to the rate of change of current flowing through the voltage bus.

27 Claims, 4 Drawing Sheets

SOLID STATE CIRCUIT BREAKER WITH CURRENT OVERSHOOT PROTECTION

BACKGROUND

Many computer mainframes in use distribute power through a high-voltage bus from a centralized bulk power supply to one or more low-voltage, DC to DC converters located near associated components such as microprocessor boards and memory boards. By using localized DC to DC converters, the converters themselves may be constructed smaller as they need not contain energy storage elements (e.g., input capacitors) for voltage regulation and isolation from a utility power supply. Furthermore, the use of a high voltage distribution bus to feed localized, low-voltage DC to DC converters minimizes resistive power losses on the voltage busses. For example, a 1000 watt, high-density multichip module (MCM) operating at a supply voltage of 2 volts will draw 500 amperes (A) of current. Therefore, the distribution resistance on the low voltage bus will dissipate 250,000 W/Ω (since power dissipated =$I^2R$). In contrast, the same amount of power distributed across a 350 volt bus is dissipated at only 8 W/Ω, a difference of over 30,000 times less power lost.

In the event that one of the localized DC to DC converters in a computer system should happen to fail, the server and high voltage bus could be overloaded. An overload on the common high voltage bus, in turn, can affect other components dependent thereupon. Accordingly, a means is typically employed to prevent an electrical overload of a common high voltage bus. Specifically, an electronic or solid state circuit breaker (SSCB) connected to an active bus, such as a computer bus, will interrupt or limit the flow of current through the bus when it is sensed that the current exceeds a predefined value (i.e., a fault condition). A current sensing device may provide an input to a differential amplifier for comparison with a reference voltage. If an overcurrent condition is detected for a certain period of time, the output of the differential amplifier (coupled with a timing circuit) causes a shutdown latch or circuit to turn off a power transistor, thereby disconnecting the bus from the load circuitry.

However, in the event of a sudden fault, such as experienced during a short circuit condition, the resulting fault current can quickly overshoot the desired maximum value before a typical SSCB can respond in time to thereafter limit the current. Because of this, the SSCB may itself be damaged, in addition to an overload of the common bus.

BRIEF SUMMARY

In an exemplary embodiment of the invention, a solid state circuit breaker is disclosed for use in connection with a voltage bus, the voltage bus supplying electrical current to a load. The solid state circuit breaker includes a current controller for controlling the magnitude of current supplied by the voltage bus. A first current sensor senses the magnitude of the electrical current supplied by the voltage bus, the first current sensor having an output in communication with the current sensor. An inductor is included within the first current sensor, the inductor providing a back electromotive force on the voltage bus. The back electromotive force is proportional to the rate of change of current flowing through the voltage bus.

In one embodiment, the first current sensor further includes a differential amplifier, the differential amplifier having an inverting input terminal connected to the voltage bus and a non-inverting terminal connected to a first reference voltage. The differential amplifier further has an output connected to the current controller, wherein the differential amplifier provides a signal to the current controller, causing the current controller to limit the magnitude of current flowing through the voltage bus when the differential amplifier senses an increase in current flowing through the voltage bus during an overcurrent condition.

BRIEF DESCRIPTION OF THE DRAWINGS

Referring to the exemplary drawings wherein like elements are numbered alike in the several Figures.

DETAILED DESCRIPTION

Figure 1:
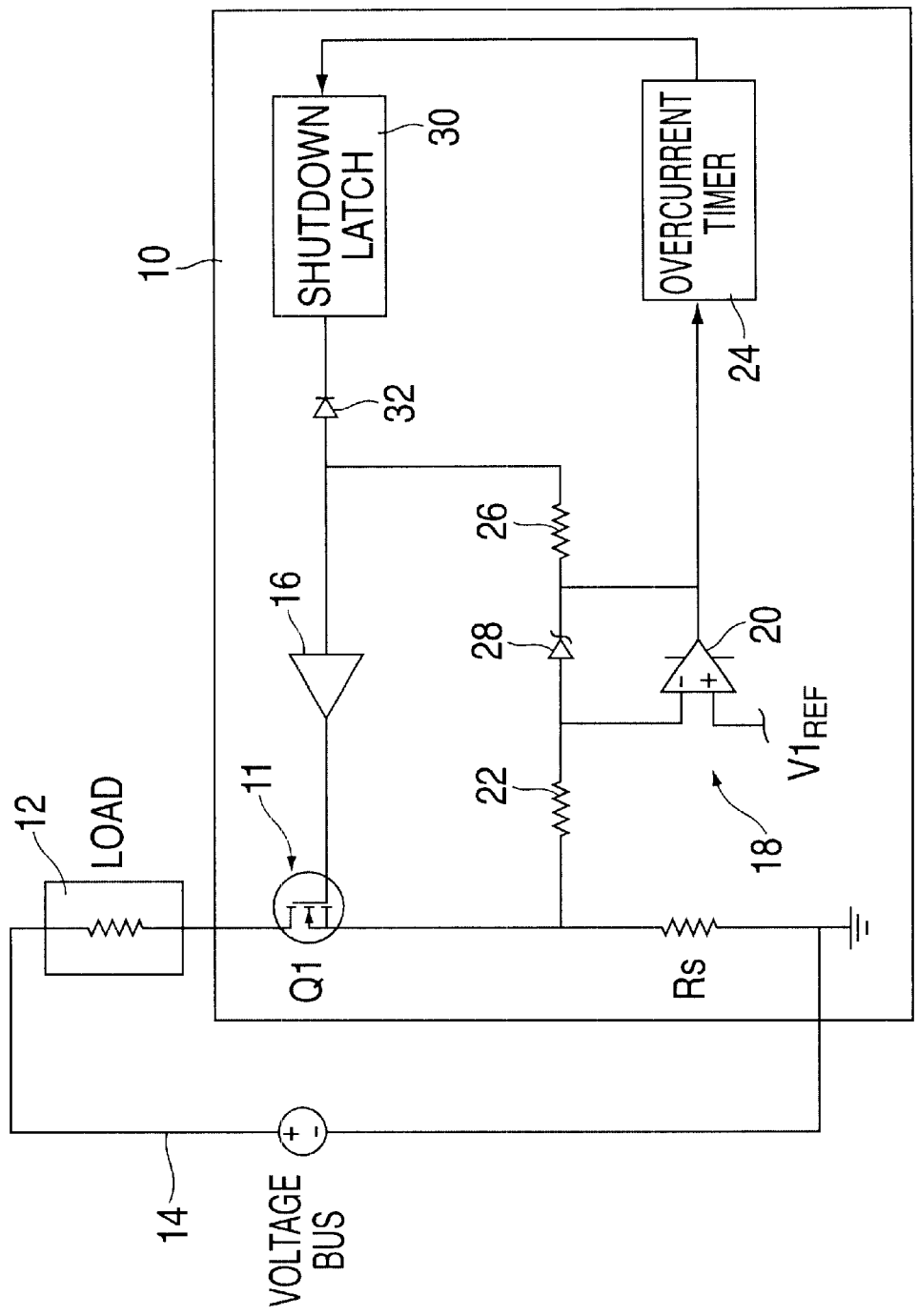
FIG. 1 is a schematic diagram of an existing solid state circuit breaker (SSCB)

Referring initially to FIG. 1, a existing solid state circuit breaker (SSCB) 10 is illustrated. SSCB 10 is shown connected in series with a load 12 fed by a high-voltage DC voltage bus 14, which may provide a supply voltage of about 350 volts DC. The SSCB 10 features a current controller 11, comprising an n-channel, enhancement mode power MOSFET(FET) Q1 having a source terminal connected to current sensing resistor $R_S$, and a drain terminal connected to load 12. The gate of Q1 is connected to the output of a buffer element 16, which provides a driving voltage to the gate of Q1 in response to an input signal applied thereto. Field effect transistors such as depicted by Q1 are commonly used in SSCBs due to their low "on" resistances, which help to maintain good efficiency.

A first current sensor 18 includes a differential amplifier 20 having a noninverting terminal (+) connected to a first reference voltage, $V1_{REF}$. The inverting terminal (−) of the differential amplifier is connected to the source terminal of Q1 and $R_S$ though resistor 22. The output of differential amplifier 20 is fed to an overcurrent timer 24, as well as to the input of buffer element 16, through resistor 26. In addition, the output of differential amplifier 20 is also fed back to the inverting terminal (−) thereof through a zener diode 28. Finally, a shutdown latch 30 receives an input signal from the overcurrent timer 24 and has an output connected to the input of buffer element 16 through diode 32.

During normal operation of the SSCB 10 in FIG. 1, Q1 is fully turned on as a result of a high output state of differential amplifier 20. Differential amplifier 20 is in a high output state during normal operation, since the current flowing through Rs is less than the set threshold level of differential amplifier 20 as determined by $V1_{REF}/R_S$.

Typically, $V1_{REF}$ is on the order of a few tenths of a volt in order to minimize the power lost in $R_S$. Zener diode 28 regulates the output voltage of differential amplifier 20, keeping it in the linear region and preventing it from saturating, thereby allowing differential amplifier 20 to quickly respond to an overload condition. Furthermore, zener diode 28 limits the gate voltage applied to Q1. In doing so, zener diode 28 thus limits the amount of charge that must be removed from the gate of Q1 in order to turn Q1 off during an overload.

In the event that an overload condition occurs, an increased current initially flows through $R_S$ which triggers a change (decrease) in the output voltage of differential amplifier 20. As a result, differential amplifier 20 adjusts the gate voltage of Q1 in order to maintain the fault current at the desired value determined by $V1_{REF}/R_S$. For example, the desired maximum fault current value may be about 12.5 amperes (A). At the same time, overcurrent timer 24 is triggered to begin timing the duration that the overcurrent condition exists. If the overcurrent condition continues to exist after a predetermined or "hold" period, the overcurrent timer 24 will send a signal to shutdown latch 30, which then completely shuts off Q1 by providing a path from the gate of Q1 to ground through diode 32.

One problem with the above described SSCB 10, however, arises in the situation where a severe overload condition occurs, such as a short circuit. In such a case, the resulting fault current will actually exceed the maximum desired value for a certain period of time due to the finite time delay inherent in the SSCB 10, which delay prevents an instantaneous response. A resulting current overshoot could then damage the voltage bus 14 or the SSCB 10 itself.

Figure 2:
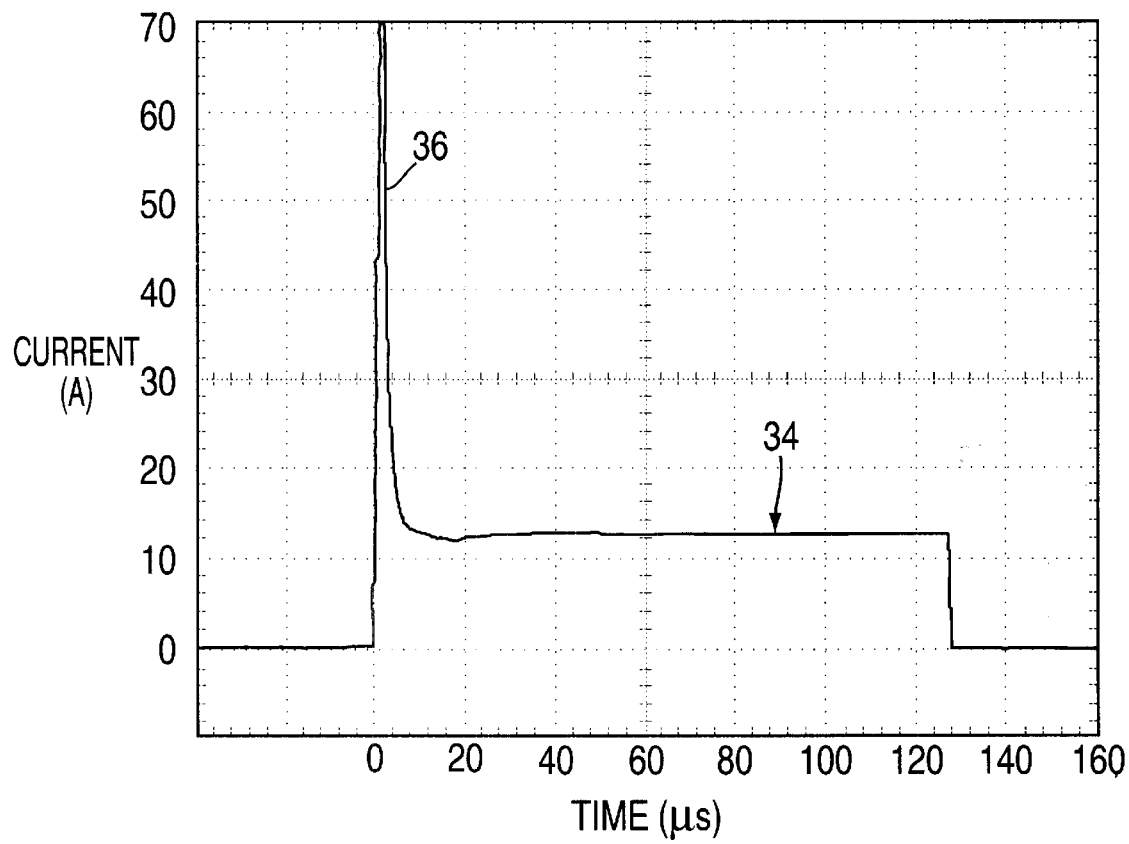
FIG. 2 is a current versus time waveform illustrating the performance of the SSCB shown in FIG. 1.

By way of example, FIG. 2 illustrates a current waveform 34 generated in response to a sudden short circuit condition when the voltage bus 14 is protected by the SSCB 10 shown in FIG. 1. Prior to t=0 seconds, no current is flowing though load 12 or bus 14, as the bus 14 is disconnected from load. Then, at t=0 seconds, a short circuit condition is introduced on bus 14 and through SSCB 10. As is evident from viewing FIG. 2, a large current spike 36 results immediately upon the short circuit condition. Although the graph shown in FIG. 2 only goes up to 70 amperes (A), the actual peak value of the current spike was approximately 81.2 A. After approximately t=8 μs, the fault current drops to a steady state value of approximately 12.5 A, as defined by $V1_{REF}/R_S$. Finally, after the overcurrent timer 24 has detected a fault level amount of current for a predetermined period of time, it sends a signal to shutdown latch 30 to completely turn off Q1 at about t=128 μs.

Because of the inherent delay in the response of the first current sensor 18, and in particular differential amplifier 20, the SSCB 10 and voltage bus 14 sustained a current spike of about 81 amperes for a duration of nearly 8 μs, before differential amplifier 20 was able to regulate the fault current at the desired level. This condition is undesirable and can potentially result in damage to the voltage bus 14 or SSCB 10, as explained earlier.

Figure 3:
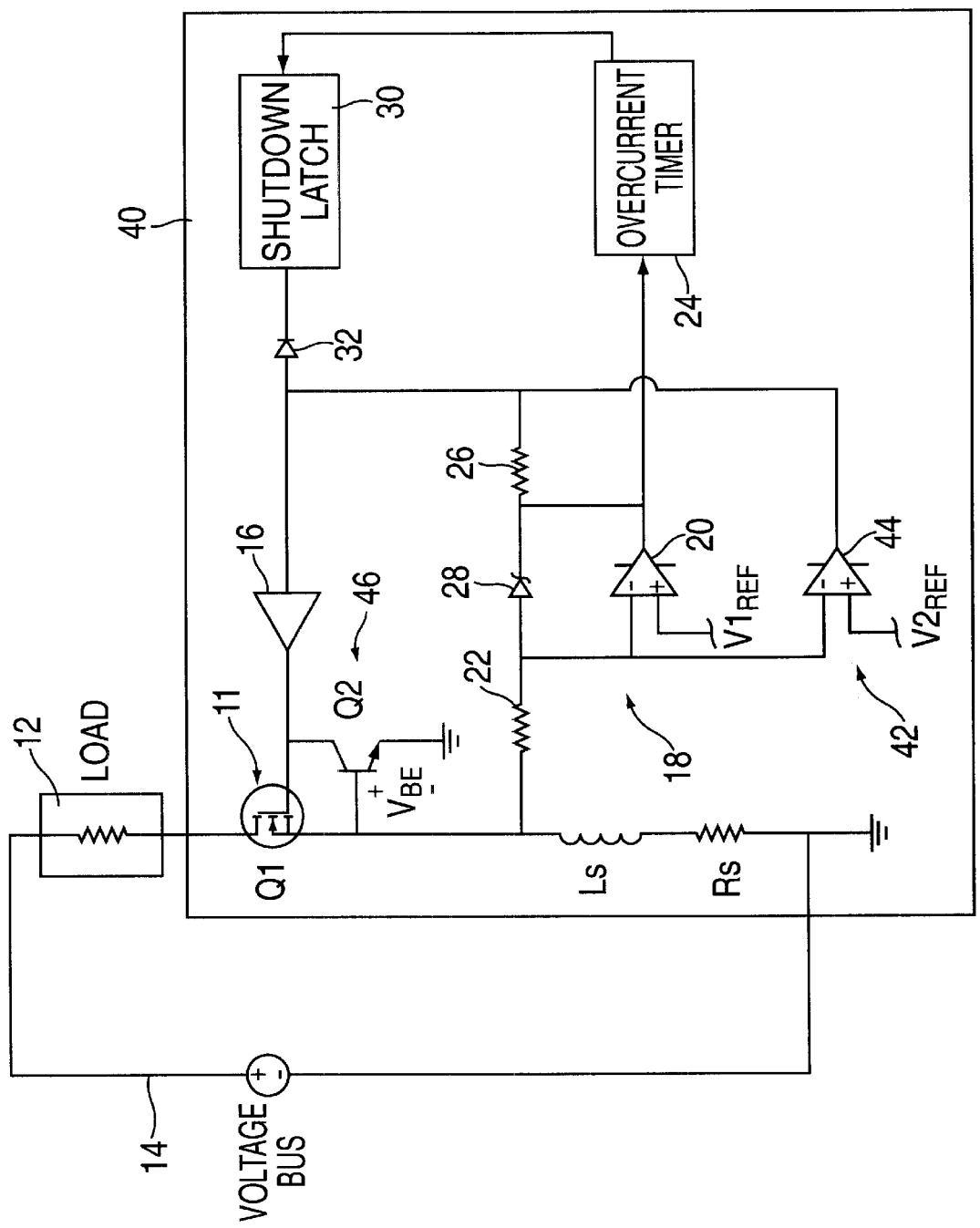
FIG. 3 is a schematic diagram of an improved SSCB in accordance with an embodiment of the invention.

Accordingly, in response to the aforementioned drawbacks, an improved SSCB 40 in accordance with an embodiment of the invention is shown in FIG. 3. For ease of description, like elements appearing in FIG. I and FIG. 3 are shown with the same reference numerals and component designations. In addition to the elements previously described, SSCB 40 further includes a second current sensor 42 having a voltage comparator 44 connected in parallel with differential amplifier 20. Specifically, voltage comparator 44 has an inverting terminal (−) connected to the inverting terminal (−) of differential amplifier 20, and an output connected to the input of buffer element 16. However, voltage comparator 44 has its non-inverting terminal (+) connected to a second reference voltage, $V2_{REF}$, which is approximately twice the value of $V1_{REF}$. Thus configured, voltage comparator 44 is an amplifier which operates in the saturation region.

An inductor, $L_S$, is connected between Q1 and $R_S$. The inductance value of $L_S$ is preferably on the order of about 20 nanohenries (nH), which is roughly equivalent to the inductance of an inch of wire. Accordingly, this inductance value may be attained by appropriately increasing the length of the associated printed circuit board wiring trace. Alternatively, a powdered-iron toroid core having a single turn can provide sufficient inductance. Finally, a third current sensor 46 includes bipolar transistor Q2 having its base terminal connected the source terminal of Q1, while the collector of Q2 is connected to the gate of Q1. The emitter of Q2 is connected to ground so that the gate of Q1 is pulled to ground whenever Q2 is switched on. Q2 is switched on when its base to emitter voltage $V_{BE}$ exceeds a threshold value of approximately 0.7 volts.

With the configuration of the SSCB 40 as shown in FIG. 3, an improved current limiting function is realized. Inductor $L_S$, resisting any sudden changes in current, provides a back electromotive force proportional to the rate of change of current ($di/dt$). As such, differential amplifier 20 will begin to reduce the gate voltage at Q1, even before the current level reaches the programmed threshold, if a sudden increase in current is detected. However, in the event that the rate of current increase exceeds $V_2REF/L_S$, then the voltage comparator 44 will act more quickly than differential amplifier 20 to adjust the gate voltage at Q1 and hold the fault current to the desired value. Finally, for yet an even faster rate of current change that exceeds $V_{BE}/L_S$, Q2 will immediately turn on and pull the gate of Q1 to ground.

Figure 4:
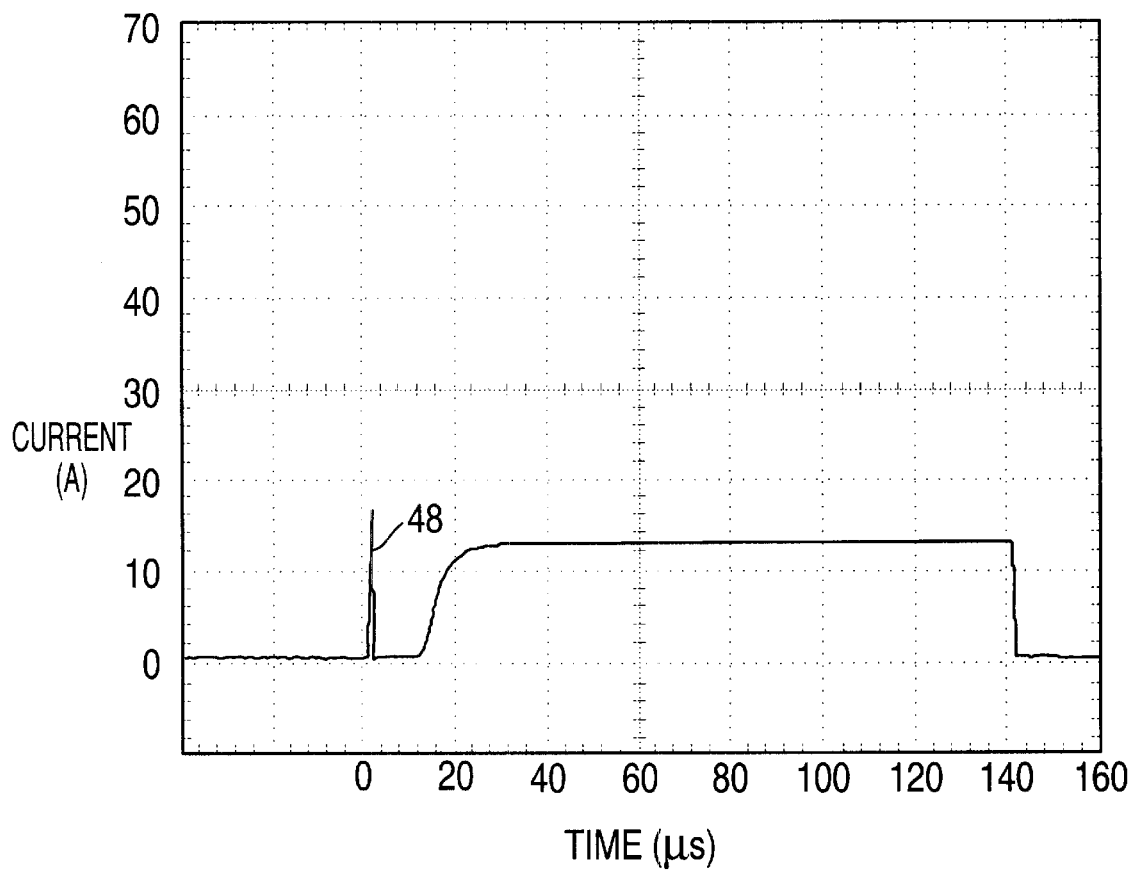
FIG. 4 is a current versus time waveform diagram illustrating the performance of the SSCB shown in FIG. 3.

Referring now to FIG. 4, the performance of the SSCB 40 in accordance with the schematic in FIG. 3 is illustrated. Once again, a short circuit condition is introduced into high-voltage bus 14 at t=0 seconds. This time, however, the resulting current spike 48 has peaked at about 16.4 amperes for approximately 2 μs. Immediately thereafter, the current is completely pinched off since the back electromotive force created by the current spike 48 through $L_S$ drives $V_{BE}$ of Q2 to its threshold value, turning Q2 on and Q1 off. At approximately t=10 μs, the current begins to rise to the desired fault current level. Because there is no longer a rapid change in current through $L_S$, the voltage thereacross will drop until Q2 is switched off. At the same time, differential amplifier 20 and/or voltage comparator 44 will have had the opportunity to regulate the input voltage applied to Q1 for operation in the linear region. Thus, as Q2 is turned off, Q1 will turn on again, but will only conduct current to the extent allowed by amplifier 20.

A smooth rise in current is seen after Q1 is turned on in its linear region. At about t=28 μs, the current reaches a steady state value of about 12.5 A (again, defined by $V1_{REF}/R_S$), until the overcurrent timer 24 causes the shutdown latch 30 to completely cut off Q1 at about t=140 μs.

It will readily be appreciated that by adding the second & third current sensors 42, 46, while at the same time improving the response performance of the first current sensor 18 with inductor $L_S$, the presently disclosed SSCB 40 provides improved protection against the high current transients associated with severe faults such as short circuit conditions. While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solid state circuit breaker for use in connection with a voltage bus, the voltage bus supplying electrical current to a load, the solid state circuit breaker comprising:

a current controller for controlling the magnitude of the electrical current supplied to the load by the voltage bus;

a current sensing resistor, connected in series with said current controller;

a first current sensor for sensing said magnitude of said electrical current supplied by the voltage bus, said first current sensor comparing the voltage across said current sensing resistor to a first reference voltage, and said first current sensor having an output in communication with said current controller; and an inductor, connected in series with said current sensing resistor, said inductor providing a back electromotive force proportional to the rate of change of said electrical current flowing through the voltage bus;

wherein said back electromotive force contributes to the magnitude of the voltage across said current sensing resistor.

2. The solid state circuit breaker of claim 1, wherein said first current sensor further comprises:

a differential amplifier, said differential amplifier having an inverting input terminal connected to said voltage bus and a non-inverting terminal connected to said first reference voltage;

wherein said differential amplifier provides a signal to said current controller, causing said current controller to limit said magnitude of said electrical current flowing through said voltage bus when said differential amplifier senses that said magnitude of said electrical current flowing through said voltage bus is equal to a value defined by said first reference voltage divided by said current sensing resistor.

3. The solid state circuit breaker of claim 2, wherein said current controller further comprises a field effect transistor, said field effect transistor further comprising:

a source terminal connected to said load;

a drain terminal connected to said inductor; and a gate terminal connected to said output of said differential amplifier.

4. The solid state circuit breaker of claim 2, wherein said current sensing resistor is connected in series with said inductor.

5. The solid state circuit breaker of claim 4, wherein said first current sensor further comprises a zener diode connected between said output of said differential amplifier and said inverting terminal of said differential amplifier, said zener diode regulating said output voltage of said differential amplifier such that said differential amplifier operates in a linear region.

6. The solid state circuit breaker of claim 3, further comprising:

a second current sensor, connected in parallel with said first current sensor, said second current sensor for sensing said magnitude of said electrical current supplied by said voltage bus, and said second current sensor having an output in communication with said current controller.

7. The solid state circuit breaker of claim 6, wherein said second current sensor further comprises:

a voltage comparator, said voltage compartor having an inverting input terminal connected to said voltage bus and a non-inverting terminal connected to a second reference voltage; and said voltage comparator further having an output connected to said current controller;

wherein said voltage comparator provides a signal to said current controller, causing said current controller to limit said magnitude of said electrical current flowing through said voltage bus when said voltage comparator senses that the rate of increase in said electrical current flowing through said voltage bus is equal to a value defined by said second reference voltage divided by the inductance value of said inductor.

8. The solid state circuit breaker of claim 7, wherein said current sensing resistor is connected in series with said inductor.

9. The solid state circuit breaker of claim 6, further comprising:

a third current sensor, connected to said voltage bus, said third current sensor for sensing said magnitude of said electrical current supplied by said voltage bus, and said third current sensing means further connected to said current controller.

10. The solid state circuit breaker of claim 9, wherein said third current sensor further comprises:

a bipolar transistor, said bipolar transistor having a base terminal connected to said voltage bus and an emitter connected to ground; and said bipolar transistor further having a collector terminal connected to said current controller;

wherein said bipolar transistor causes said current controller to interrupt said electrical current flowing through said voltage bus when said rate of said electrical current increase is equal to the voltage across said base and said emitter terminals divided by said inductance value of said inductor.

11. The solid state circuit breaker of claim 2, further comprising:

an overcurrent timer, connected to said output of said differential amplifier, said overcurrent timer timing the duration that an overcurrent condition exists; and a shutdown latch, connected to an output of said overcurrent timer, said shutdown latch further connected to said current controller, said shutdown latch causing said current controller to interrupt said electrical current flowing through said voltage bus when said overcurrent timer determines that the duration of said overcurrent condition has reached a predetermined value.

12. A solid state circuit breaker for use in connection with a voltage bus, the voltage bus supplying electrical current to a load, the solid state circuit breaker comprising:

a current controlling means for controlling the magnitude of the electrical current supplied by the voltage bus;

a current sensing resistor, connected in series with said current controlling means;

a first current sensing means for sensing the magnitude of the electrical current supplied by the voltage bus, said first current sensing means comparing the voltage across said current sensing resistor to a first reference voltage, and said first current sensing means having an output in communication with said current controlling means; and an inductor, connected in series with said current sensing resistor, said inductor providing a back electromotive force proportional to the rate of change of said electrical current flowing through the voltage bus;

wherein said back electromotive force contributes to the magnitude of the voltage across said current sensing resistor.

13. The solid state circuit breaker of claim 12, wherein said first current sensing means further comprises:
a differential amplifier, said differential amplifier having an inverting input terminal connected to said voltage bus and a non-inverting terminal connected to said first reference voltage;
wherein said differential amplifier provides a signal to said current controlling means, causing said current controlling means to limit said magnitude of said electrical current flowing through said voltage bus when said differential amplifier senses that said magnitude of said electrical current flowing through said voltage bus is equal to a value defined by said first reference voltage divided by said current sensing resistor.

14. The solid state circuit breaker of claim 13, wherein said current controlling means further comprises a field effect transistor, said field effect transistor further comprising:
a source terminal connected to said load;
a drain terminal connected to said inductor; and
a gate terminal connected to said output of said differential amplifier.

15. The solid state circuit breaker of claim 13, wherein said current sensing resistor is connected in series with said inductor.

16. The solid state circuit breaker of claim 15, wherein said first current sensing means further comprises a zener diode connected between said output of said differential amplifier and said inverting terminal of said differential amplifier, said zener diode regulating said output voltage of said differential amplifier such that said differential amplifier operates in a linear region.

17. The solid state circuit breaker of claim 14, further comprising:
a second current sensing means, connected in parallel with said first current sensing means, said second current sensing means for sensing said magnitude of said electrical current supplied by said voltage bus, and said second current sensing means having an output in communication with said current controlling means.

18. The solid state circuit breaker of claim 17, wherein said second current sensing means further comprises:
a voltage comparator, said voltage compartor having an inverting input terminal connected to said voltage bus and a non-inverting terminal connected to a second reference voltage; and
said voltage comparator further having an output connected to said current controlling means;
wherein said voltage comparator provides a signal to said current controlling means, causing said current controlling means to limit said magnitude of said electrical current flowing through said voltage bus when said voltage comparator senses that the rate of increase in said electrical current flowing through said voltage bus is equal to a value defined by said second reference voltage divided by the inductance value of said inductor.

19. The solid state circuit breaker of claim 18, wherein said current sensing resistor is connected in series with said inductor.

20. The solid state circuit breaker of claim 17, further comprising:

a third current sensing means, connected to said voltage bus, said third current sensing means for sensing said magnitude of said electrical current supplied by said voltage bus, and said third current sensing means further connected to said current controlling means.

21. The solid state circuit breaker of claim 20, wherein said third current sensing means further comprises:
a bipolar transistor, said bipolar transistor having a base terminal connected to said voltage bus and an emitter connected to ground; and
said bipolar transistor further having a collector terminal connected to said current controlling means;
wherein said bipolar transistor causes said current controlling means to interrupt said electrical current flowing through said voltage bus when said rate of said electrical current increase is equal to the voltage across said base and said emitter terminals divided by said inductance value of said inductor.

22. The solid state circuit breaker of claim 13, further comprising:
an overcurrent timer, connected to said output of said differential amplifier, said overcurrent timer timing the duration that an overcurrent condition exists; and
a shutdown latch, connected to an output of said overcurrent timer, said shutdown latch further connected to said current controlling means, said shutdown latch causing said current controlling means to interrupt said electrical current flowing through said voltage bus when said overcurrent timer determines that the duration of said overcurrent condition has reached a predetermined value.

23. A method for controlling the magnitude of current flowing through a voltage bus, the method comprising:
sensing the magnitude of the current flowing through the voltage bus with a first current sensor by comparing a voltage developed across a current sensing resistor connected to the voltage bus with a first reference voltage, wherein said voltage developed across said current sensing resistor includes a back electromotive force component generated by an inductor in series with said current sensing resistor, said back electromotive force being proportional to the rate of change of current flowing through the voltage bus; and
using an output of said first current sensor to control the operation of a current controller, said current controller being used to control the amount of current to be passed through the voltage bus.

24. The method of claim 23, wherein said first current sensor further comprises a differential amplifier, said differential amplifier providing a signal to said current controller, causing said current controller to limit the magnitude of current flowing through the voltage bus when said differential amplifier senses that the magnitude of current flowing through the voltage bus is equal to a value defined by said first reference voltage divided by said current sensing resistor.

25. The method of claim 24, wherein said current controller further comprises a field effect transistor having a gate terminal connected to said output of said differential amplifier.

26. The method of claim 25, further comprising:
sensing the magnitude of the current flowing through the voltage bus with a second current sensor by comparing said voltage developed across said current sensing resistor with a second reference voltage;
wherein said second provides a signal to said current controller, causing said current controller to limit the magnitude of current flowing through the voltage bus when said second current sensor senses that the rate of increase in current flowing through the voltage bus is equal to a value defined by said second reference voltage divided by the inductance value of said inductor.

27. The method of claim 26, further comprising:

sensing the magnitude of the current flowing through the voltage bus with a third current sensor, said third current sensor comprising a bipolar transistor having a base terminal connected to the voltage bus and an emitter connected to ground, and said bipolar transistor further having a collector terminal connected to said current controller;

wherein said bipolar transistor causes said current controller to interrupt current flowing through the voltage bus when the rate of current increase is equal to the voltage across said base and said emitter terminals divided by said inductance value of said inductor.

* * * * *